Aug. 3, 1965    L. S. FLORSHEIM, JR., ETAL    3,198,069
MOTOR OPERATED COPYBOARD
Filed March 1, 1963    4 Sheets-Sheet 4

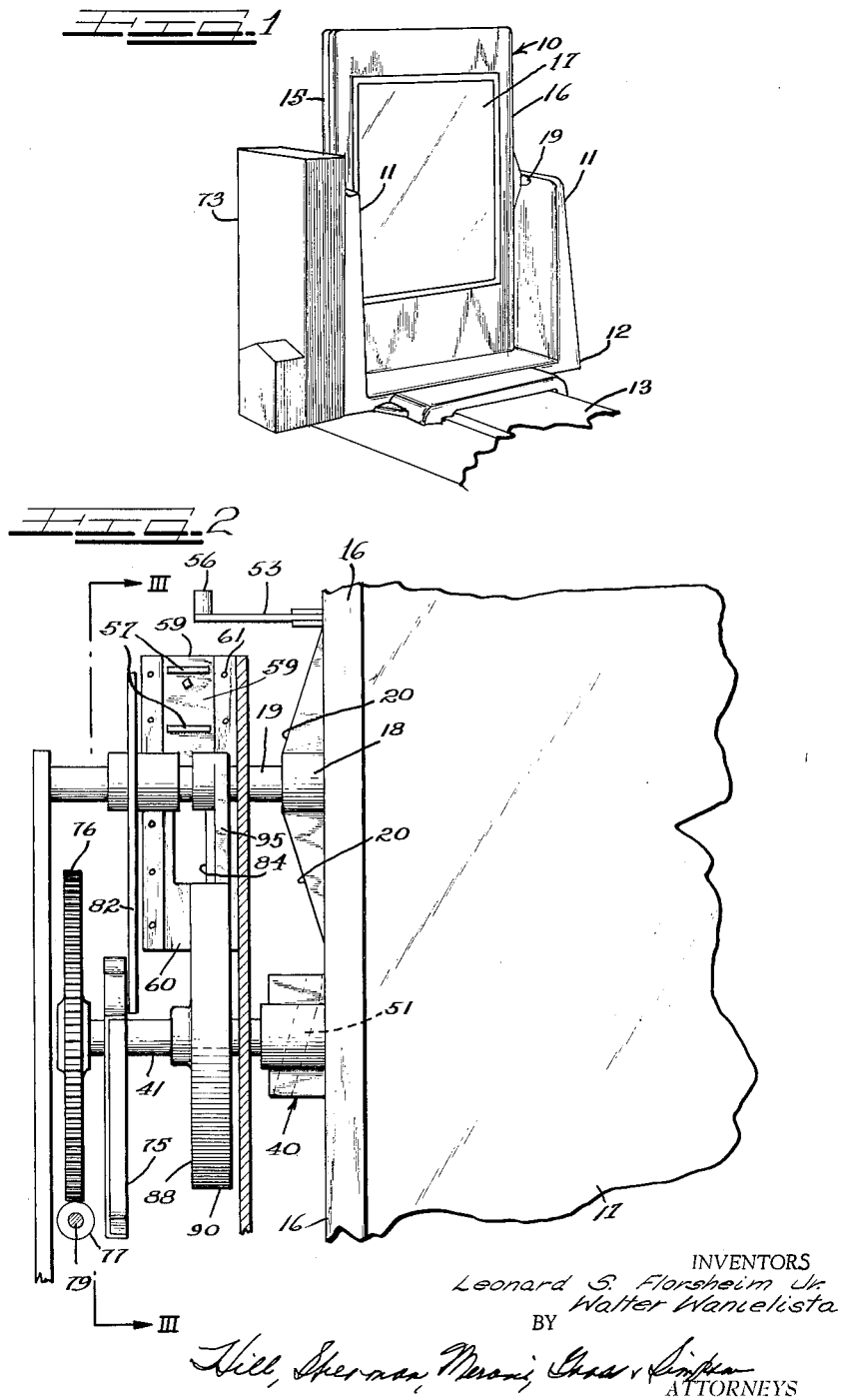

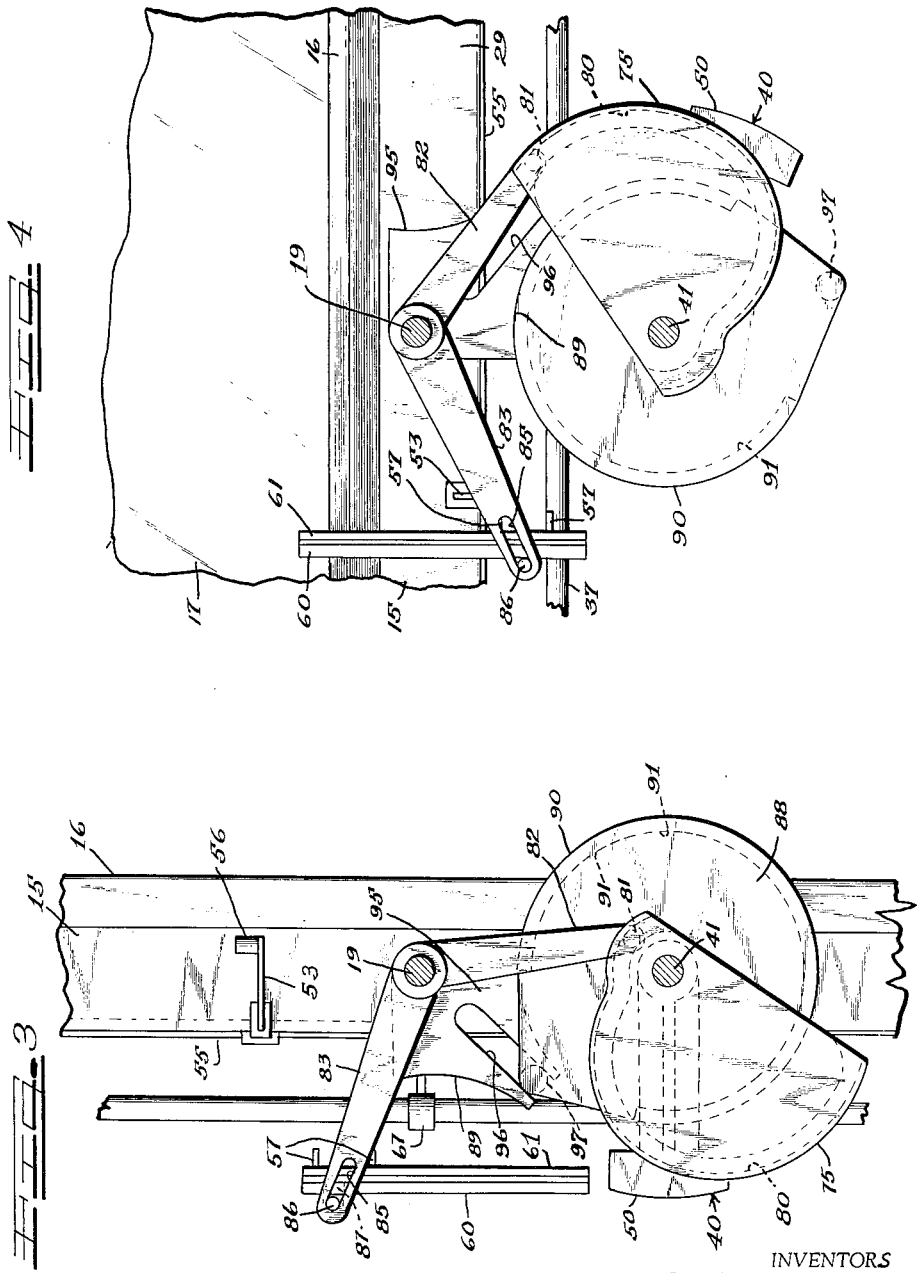

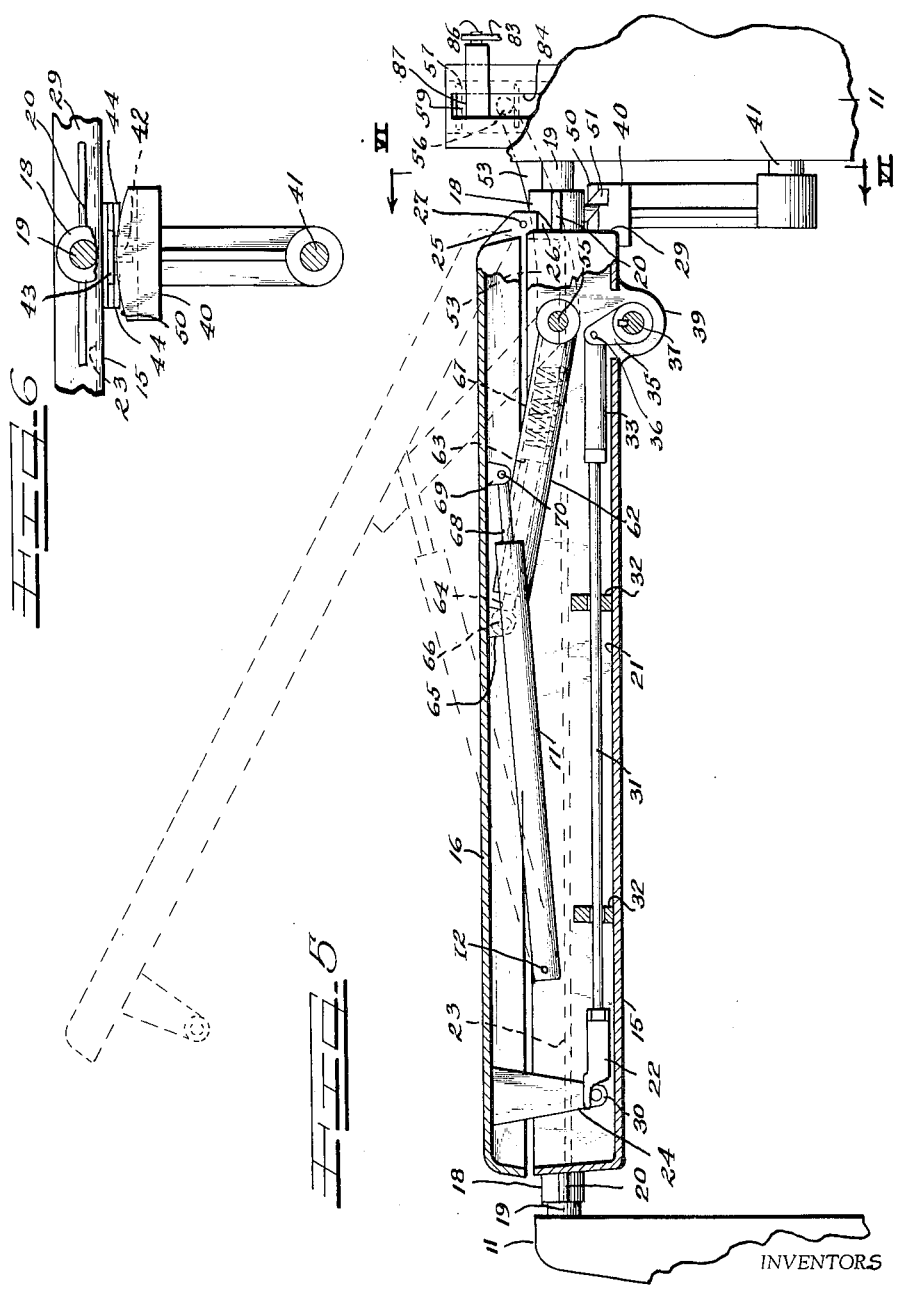

INVENTORS
Leonard S. Florsheim Jr.
Walter Wanielista
BY
ATTORNEYS

United States Patent Office 3,198,069
Patented Aug. 3, 1965

3,198,069
MOTOR OPERATED COPYBOARD
Leonard S. Florsheim, Jr., Glencoe, and Walter Wanielista, Westchester, Ill., assignors to Robertson Photo-Mechanix, Inc., Chicago, Ill., a corporation of Illinois
Filed Mar. 1, 1963, Ser. No. 262,026
12 Claims. (Cl. 88—24)

This invention relates to improvements in copyboards for graphic arts camera apparatus and the like.

A principal object of the invention is to provide a novel and improved form of copyboard moved into its various operative positions by power, in which the power means includes a positioning means for stopping the copyboard in its loading and copying positions.

A further object of the invention is to provide a novel form of copyboard for use with graphic arts camera apparatus in which the copyboard is positioned in a horizontal position for loading and in a vertical position for copying, and in which the positioning unlatching and opening operations of the copyboard are successively attained by the pressing of a button.

Another object of the invention is to improve upon the copyboards heretofore in use with graphic arts camera apparatus by positioning the copyboard by power into its horizontal loading and unloading positions and in its copying positions and by utilizing the positioning mechanism to locate the copyboard in the same copying position each time the board is loaded.

Still another object of the invention is to improve upon the copyboards heretofore in use by positioning the board in its loading and copying positions, latching and unlatching the cover, and opening and closing the cover by power operated means effecting the positioning latching and unlatching and opening and closing operations of the cover in a preselected sequence, and assuring the latching of the copyboard upon the placing of copy therein and prior to turning of the board to a vertical copying position.

These and other objects of the invention will appear from time to time as the following specification proceeds and with reference to the accompanying drawings wherein:

FIGURE 1 is a diagrammatic perspective view of a copyboard constructed in accordance with the principles of the present invention;

FIGURE 2 is a fragmentary view of the copyboard looking at the board towards the cover side of the board with the structure for supporting the board broken away and partially shown in section in order to illustrate certain details of the operating mechanism for the copyboard;

FIGURE 3 is a fragmetnary vertical sectional view taken substantially along line III—III of FIGURE 2 with certain parts removed and showing the copyboard in a vertical position with the casing for the operating mechanism for the copyboard broken away;

FIGURE 4 is a partial fragmentary sectional view taken along the same general lines as FIGURE 3 with certain parts removed, but showing the copyboard in a horizontal position with its cover open to accommodate the placing of copy on the board;

FIGURE 5 is a transverse sectional view taken through the copyboard when in its horizontal position showing the board in its closed and latched position in solid and showing the board in its open position in dashed lines;

FIGURE 6 is a partial fragmentary sectional view taken substantially along line VI—VI of FIGURE 5;

Figure 7:
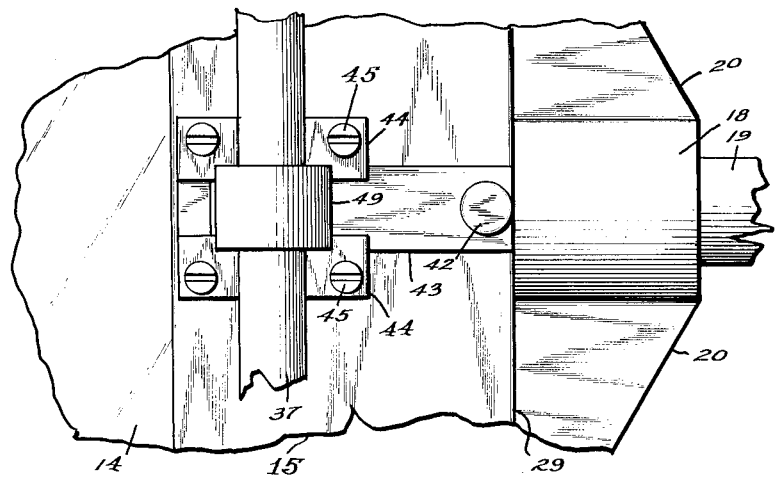
Figure 8:
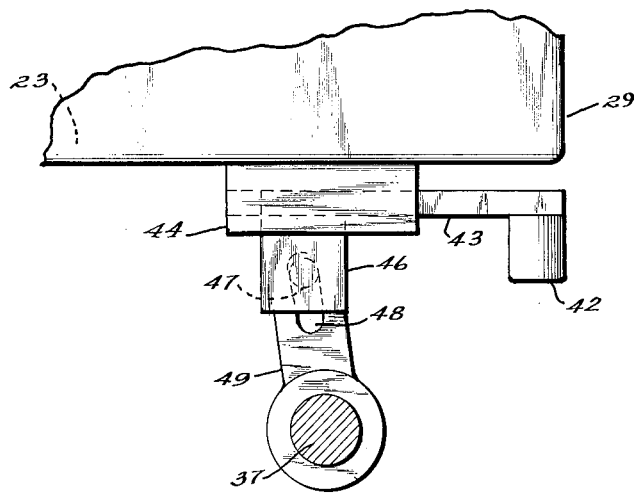

FIGURE 7 is a fragmentary view of the copyboard with certain parts removed and certain other parts in section and looking at the board from the bottom thereof in order to show certain details of the mechanism for unlatching the cover part of the board; and FIGURE 8 is a partial fragmentary detail view of the copyboard with certain parts removed in order to illustrate certain details of the unlatching mechanism not shown in FIGURES 6 and 7.

In the embodiment of the invention illustrated in the drawings, we have generally shown in FIGURE 1 a copyboard 10 of a type utilized with photographic reproducing apparatus such as graphic arts camera equipment and the like.

The copyboard 10 is shown as being trunnioned between parallel spaced upright arms 11, 11 of a generally U-shaped support 12, mounted on a guide track 13, forming a guide track to adjust the position of the copyboard with respect to a camera lens (not shown).

The copyboard 10 generally includes a base or a back section 15 having a clear glass 14 framed thereby and a cover section 16 hinged to said base section, as will hereinafter more clearly appear as this specification proceeds. The cover section 16 frames a clear glass 17, accommodating subjects on the base section under the glass to be photographed. The base section 15 has bosses 18 extending outwardly from opposite sides thereof having trunnion shafts 19 extending outwardly therefrom and suitably journalled in the upright arms 11, 11 of the support frame 12. The bosses 18 are braced to the side walls of the base section by gusset plates 20, 20. The base section also has wells 21 extending along each side thereof and forming receptacles for latches 22 latching the cover section 16 in a closed position. The space between the wells 21 forms a frame 23 for the glass 14 upon which copy may be placed.

The base section 15 also has a side wall 29 from which one boss 18 and trunnion pin 19 extends. Spaced hinge ears 26 extend outwardly of said side wall and are partially lapped by hinge ears 25 extending laterally and downwardly of the cover section 16. Hinge pins 27 extend through the ears 25 and 26 to accommodate the cover to be moved into its open and closed positions about the axes of said hinge pins.

The opposite end of the cover section 16 from the hinge pins 27 has spaced plates 24 depending therefrom into the wells 21. The plates 24 have keeper pins 30 extending outwardly from the lower end portions thereof and engaged by the latches 22, for latching the cover in its closed position.

The latches 22 are carried on the ends of rods 31 slidably guided in spaced lugs 32, 32 projecting upwardly from the bottoms of the wells 21. The ends of the rods 31, opposite from the latches 22, have connectors 33 threaded thereon and pivotally connected at their outer ends to levers 35 on pivot pins 36. The levers 35 are mounted on a rock shaft 37 suitably journalled in bosses 39 depending from the wells 21. The rock shaft 37 is rocked to move the latch 22 into its release and latching positions by operation of a locking cam 40 mounted on the inner end of a cam shaft 41 and moving upwardly to engage a follower 42 on the outer end of a slide 43, as the copyboard is turned into a horizontal position and prior to opening of the cover section 16. The slide 43 is shown in FIGURES 6 and 7 as being in alignment with the trunnion shaft 19 and spaced therebeneath. The slide 43 is guided on the underside of the base section 15 in gibbed guides 44 secured to the underside of said base section as by machine screws 45. The slide 43 has an ear 46 depending therefrom having a pivot pin 47 mounted thereon and extending transversely thereof and slidable along a slot 48 formed in a lever 49 keyed or otherwise secured to the rock shaft 37.

The locking cam 40 is in the form of a block having an arcuate outer face 50 having a spiral cam groove 51 therein. As the copyboard 10 is positioned in a horizontal position, the locking cam 40 will have moved upwardly a distance sufficient to engage the follower 42 in the cam groove 51. Continued movement of the locking cam in the same direction will move the slide 43 outwardly and rock the shaft 37 to release the latches 22 from the keeper pins 30. The cover section 16 may then be opened by power in a manner which will hereinafter more clearly appear as this specification proceeds. Upon reverse movement of the locking cam 40, the spiral slot or cam groove engaging the follower 42 will move the latches into engagement with the latching pins 30 and positively lock the cover section closed.

The timing of movement of the locking cam 40 is such that the cover section 16 can only be opened when in a horizontal loading position and is locked closed when the copyboard is loaded with copy prior to turning of the copyboard to assure the copy be retained in the correct position for copying, as the copyboard moves from its horizontal loading to its vertical copying position.

The cover section 16 is moved to its open and closed positions by operation of a lever 53 on a rock shaft 55. The lever 53 extends outwardly of the side wall 29 of the base section 15 and has a follower 56 on its outer end extending between spaced abutments 57 extending outwardly of a vertically movable slide 59, as the copyboard 10 moves into its horizontal loading or unloading positions. The slide 59 is guided for movement along a vertically extending guide plate 60 in gibbed guides 61, extending along opposite sides of said guide plate. The rock shaft 55 has a tubular lever arm 62 mounted thereon and extending radially inwardly therefrom having a piston 63 slidably mounted therein. A rod 64 extends from the piston 63 beyond the open end of the tubular lever 62 and is pivotally connected between spaced lugs 65 on a pivot pin 66. A compression spring 67 is seated in the tubular lever arm 62 and biases the piston 63 and rod 64 outwardly with respect to said lever arm 62. The lugs 65 depend from the inside of the cover 16 when the cover section is in a closed position.

A spring pressed counterbalancing rod 68 is also connected between spaced lugs 69 depending from the inside of the cover section 16, on a pivot pin 70. The counterbalancing rod 68 extends from a piston (not shown) slidably movable within a tube 71 pivotally connected to the base section 15 on a pivot pin 72. A suitable spring (not shown) carried within the cylinder 71 biases the rod 68 outwardly with respect to said cylinder. Thus, as the copyboard comes into a horizontal position and the follower 56 moves into the space between the abutments 57 and the plate 59 is moved downwardly along the gibbed guides 60 by power, the lever 53 will be pivoted in a direction, which in FIGURE 5 is a clockwise direction. This will move the lever arm 62 in the same direction and effect opening of the cover section 16 to enable copy to be placed on the copyboard. As the slide 59 and abutments 57 are moved upwardly, the lever 53 will rock the rock shaft 55 in an opposite direction to close the copyboard, after which time the cam 40 will positively move the latches 22 into locking engagement with the keeper pins 30. The cover and latches will then be in the position shown in FIGURE 5.

Referring now in particular to the means for moving the slide 59 vertically and positioning the copyboard into its horizontal loading and unloading positions and its vertical copying position, the cam shaft 41 is suitably journalled within a casing 73 extending about and outwardly of the support arm 11, on the side of the apparatus, which in FIGURE 5 is the right hand side of the apparatus. A cam 75 is keyed or otherwise secured to said cam shaft. The cam shaft 41 is driven from a worm gear 76 keyed or otherwise secured thereto driven from a worm 77 on a horizontal shaft 79. The horizontal shaft 79 in turn is driven from a motor (not shown) which may be a well known form of electric motor.

The cam 75 has a cam groove 80 therein along which rides a follower 81 on the lower end of a lever arm 82, rockingly mounted on the trunnion shaft 19, for free movement with respect thereto. A lever arm 83 extends from the shaft 19 and may be formed integrally with the lever arm 82. The lever arm 83 has a slot 85 extending along its outer end portion. The slot 85 is slidably engaged by a pin 86 extending from a lug 87 formed integrally with the slide 59 and extending from said slide through a vertical slot 84 in the guide plate 60.

Thus, as the copyboard is rotated into a horizontal position to bring the follower 56 into the space between the abutments 57, 57 and the cam 75 is rotating in a clockwise direction, the levers 82 and 83 will be rocked about the trunnion shaft 19 in a counterclockwise direction. The slide 59 will thus be moved downwardly along the guide plate 60 and gibbed guides 61 and rotate the lever arm 53 and shaft 55 in a direction which in FIGURE 5 is shown as being a clockwise direction. This will in turn rotate the lever arm 62 in the same direction and open the cover section 16. Reverse rotatable movement of the cam 75 will reverse the direction of rocking movement of the lever arms 82 and 83 and reverse the direction of movement of the slide 59 and abutments 57, to move the cover section 16 into a closed position.

Referring now in particular to the means for turning the copyboard 10 in its upright copying position and its horizontal loading and unloading positions and stopping the copyboard in the exact same position during each cycle of positioning of the copyboard, a lever arm 95 is keyed or otherwise secured to the shaft 19 and extends downwardly therefrom. The lever arm 95 has a radial slot 96 therein opening to the lower end of said lever arm and engaging a driver member 97 on a driving member 88 keyed or otherwise secured to the cam shaft 41. The lever arm 95 has arcuate indexing or stop faces 89 extending therealong on each side of the slot 96 and engageable with a circumferential indexing or stop surface 90 on the driving member 88, and extending thereabout for a portion of the periphery thereof. The holding surface 90 is formed by the outer peripheral surface of a rim 91 extending inwardly of the driving member 88 and in the form of an annular sector terminating at opposite sides of the drive member 97 to accommodate the lever arm 95 to be moved into the space between the ends of said rim as the driving member 88 rotates to effect pivotal movement of the lever arm 95 by movement of the driver member 97 along the slot 96.

The driving member 88 and lever arm 95 are thus in the form of a modified Geneva movement and when the lever arm 95 is at either of its extreme positions, it is held in these positions by engagement of an indexing surface 89 of said lever arm with the indexing surface 90 of said driving member. This assures the copyboard 10 will always be in the same vertical copying position and horizontal loading and unloading positions at the termination of rotation of the driving member 88 as the driver member 97 is out of engagement with the slot 96.

It should also be understood that when the copyboard is in its horizontal loading or unloading positions, the slot 96 will have moved from the position shown in FIGURE 3 to the position shown in FIGURE 4 and when in this last mentioned position, the driver member 97 has moved out of the slot 96. Upon reversal in the direction of rotation of the cam shaft 41 the indexing surfaces 89 and 90 will stop the lever arm 95 in position to accommodate the driver member 97 to move into the slot 96 and rotate the lever arm or Geneva driven member 95 in a clockwise direction, to return the copyboard into its vertical copying position.

It will be noted from FIGURE 4 that when the driving member 88 reverses its direction of rotation to effect movement of the copyboard to its vertical copying position, the driver member 97 follows the opening and closing cam 75 and the locking cam 40 and trails said cams a sufficient distance to first effect clockwise movement of the slotted lever arm 83 by rotation of the cam 75 to move the slide 59 upwardly along the guide plate 60 and gibbed guide 61 and thereby pivot the lever 53 in a direction to first close the copyboard. As the copyboard moves to its closed position, the cam groove 51 in the locking cam 40 will come into engagement with the follower 42, to effect movement of the slide 43 inwardly and rocking movement of the shaft 37 in a counterclockwise direction to bring the latches 22 into latching engagement with the keeper pins 30, as the locking cam moves along the follower 42. This will positively latch the cover section 16 in its closed position and will assure the holding of copy in position in the copyboard prior to turning of the copyboard into its upright copying position as the driver member 97 comes into engagement with the slot 96 and pivots the lever arm 95 or Geneva driven member in a clockwise direction into its upright copying position.

The motor for driving the cam shaft 41 may be operated under the control of a suitable electrical control system in which the period of energization of the motor is timed and the motor is deenergized at the ends of the timing periods. The control may be operated by a push button (not shown) which when depressed a first time will effect movement of the copyboard from its vertical copying position to the horizontal loading positions and when depressed the second time will effect reversal in the direction of rotation of the motor and reversal of the operating cycle. The direction of rotation of the motor thus may be reversed from its previous direction of rotation each time the push button is depressed to effect automatic movement of the copyboard from its copying to its horizontal loading position, and from its horizontal loading position to its copying position by the mere pressing of a single push button. The control for the motor may be of any conventional form so is not herein shown or described since it forms no part of the present invention.

It should further be understood that the driving member 88 and driver member 97 are so positioned with respect to the cams 40 and 75 that upon rotation of the cam shaft 41 in a direction to position the copyboard into a loading position, the drive member 88 will first move the driver member 97 upwardly along the slot 96 to pivot the copyboard in a counterclockwise direction into an unloading or loading position. As the copyboard is moved into its horizontal position, the cam 40 will follow the driver member 97. The cam groove 51 in the face of the cam 40 will come into engagement with the follower 42 on the slide 43, to effect release of the latches 22, in the previously described manner. As the copyboard is moved into its horizontal loading position, the follower 56 on the lever 53 will have been moved into the space between the abutments 57 on the slide 59. Continued movement of the cam 75 will then pivot the slotted lever arm 53 in the counterclockwise direction to depress the abutments 57 and pivot the lever arm 53 in a clockwise direction and open the cover 16 by power in the previously described manner.

As the cover is opened and copy has been placed in the copyboard, the cam 75 will first move the slide 59 and abutments 57 upwardly to close the cover, the cam 40 will then move the cam groove 51 into engagement with the follower 42 to engage the latches 22 with the keeper pins 30 and latch the cover in its closed position. The actuate stop or indexing surface 89 in engagement with arcuate stop or indexing surface 90 will hold copyboard in its horizontal position until latched, at which time the driver member 97 will come into engagement with the slot 96 and pivot the lever arm or Geneva driven member 95 in a clockwise direction, and thereby position the copyboard 10 into its vertical copying position, positively holding the copyboard in this position by engagement of the arcuate indexing surface 89 of the lever arm 95 with the arcuate indexing surface 90 of the driving member 88. Rotation of the motor will then stop and the copyboard will be positively held in the same copying position each time it is positioned from a loading position to a copying position.

While we have herein shown and described one form in which our invention may be embodied, it may readily be understood that various variations and modifications in the invention may be attained without departing from the spirit and scope of the novel concepts thereof.

We claim as our invention:

1. A copyboard having a base section and a cover section hinged to said base section for selective opening and closing movement, latch means releasably locking said cover section in a closed position, support means for said base section supporting said base section for pivotal movement into a vertical copy position and into horizontal copy loading and unloading positions, and power means for moving said copyboard into vertical and horizontal positions and holding said copyboard in these positions comprising an oscillatably driven driving member having an indexing face thereon, a driven member having operative connection with said copyboard, means oscillatably driven by said driving member for oscillatably driving said driven member, said driven member having oppositely facing indexing faces thereon alternately engageable with said indexing face of said driving member as the copyboard is positioned into its vertical and horizontal positions and holding the copyboard in these positions.

2. A copyboard having a base section and a cover section hingedly mounted on said base section for selective opening and closing movement, latch means releasably locking said cover section in a closed position, support means for said copyboard including trunnion shafts extending laterally from said base section and trunnion supports for said shafts, means for pivotally moving said copyboard about said trunnion shafts comprising a lever arm secured to one of said trunnion shafts and having a radial slot therein opening to the outer end thereof and having indexing surfaces on opposite sides of said slot, a driving member having driving engagement with said slot and having an indexing surface extending thereabout for a portion of the periphery thereof, said driving member pivotally moving said lever arm to pivot said copyboard in one position and bring one indexing surface on said lever arm into engagement with said indexing surface of said driving member in one direction of rotation of said driving member and to pivot said lever arm in an opposite direction and bring the opposite indexing surface in engagement with said indexing surface of said driving member in an opposite direction of rotation of said driving member.

3. A copyboard having a base section and a cover section hingedly mounted on said base section for selective opening and closing movement, latch means releasably locking said cover section in closed relation with respect to said base section, means supporting said copyboard for movement into vertical copying positions and horizontally disposed loading and unloading positions comprising trunnion shafts extending laterally of said base section intermediate the ends thereof and trunnion supports for said shafts, and means positioning said copyboard into its vertical copying position and horizontal loading position and holding said copyboard in these positions including a reciprocably driven driving member having an indexing surface and a gap between opposite ends of said indexing surface and having a driver member mounted thereon and spaced equally between the ends of said gap, a lever arm secured to one of said trunnion shafts and having a radial slot engaged by sid driver member, and indexing surfaces on opposite sides of said slot conforming to the form of said indexing surface on said reciprocably driven driving member and alternately engaging said indexing surface on said reciprocably driven driving member and stopping said lever arm and copyboard in position as said copyboard is moved from one position to another.

4. In a copyboard, a base section, a cover section pivotally mounted on said base section for selective opening and closing movement, latch means releasably latching said cover section in a closed position, pivotal support means for said copyboard including trunnion shafts extending laterally from opposite sides of said base section intermediate the ends thereof, upright trunnion supports for said trunnion shafts, means for positioning said copyboard into horizontal loading and unloading positions and into a vertical copying position and holding said copyboard in these positions, comprising a cam shaft parallel to said trunnion shafts, a geared drive connection to said cam shaft, a driving member on said cam shaft and reciprocably driven thereby, said driving member having a circumferential indexing rim extending thereabout for a portion of the periphery thereof and having terminal ends spaced from each other, a driver member on said driving member spaced outwardly of and midway between said terminal ends, a lever arm on the trunnion shaft adjacent said cam shaft and driving member and extending from said trunnion shaft toward said driving member, said lever arm having a radial slot therein and having concave indexing surfaces on opposite sides of said slot conforming to the circumferential form of said indexing rim, said holding surfaces indexing said slot in position to be engaged by said driver member in each direction of rotation of said driver member and alternately holding said copyboard in its vertical copying position and its horizontal loading and unloading positions.

5. In a copyboard, a base section, a cover section pivotally mounted on said base section for selective opening and closing movement, latch means releasably locking said cover section in a closed position, pivotal support means for said copyboard including trunnion shafts extending laterally from opposite sides of said base section intermediate the ends thereof and upright trunnion supports for said trunnion shafts, a reciprocably movable power driven cam shaft, means driven by said cam shaft for positioning said copyboard in horizontal loading and unloading positions and in a vertical copying position and holding said copyboard in these positions, other means reciprocably driven by said cam shaft for opening and closing said cover section, and still other means reciprocably driven by said cam shaft for releasing said latch upon movement of said copyboard from a copying to a horizontal loading position comprising a releasing cam extending radially of said cam shaft and having an arcuate outer surface having a cam groove extending diagonally thereacross, a release slide guided for movement along said base section toward and from an associated trunnion support and moved into position to be engaged by said cam groove and in a release direction upon rotation of said cam in one direction and in a latching direction upon rotation of said cam in an opposite direction and positioned to register with said cam groove by said means for positioning said copyboard in vertical and horizontal positions.

6. In a copyboard, a base section, a cover section hinged to said base section for selective opening and closing movement, a latch for releasably locking said cover section closed, trunnion pins extending laterally from opposite sides of said base section intermediate the ends thereof, trunnion supports for said trunnion pins, power means for moving said latch in release and latching directions comprising a cam shaft parallel to and spaced from an associated trunnion shaft, a locking cam on said shaft having a cam groove extending diagonally across the periphery thereof, a slide guided in said base section for movement toward and from the trunnion support adjacent said locking cam, a link and lever connection between said slide and latch, said slide being positioned by said copyboard when in a horizontal position to be engaged by said cam groove upon rotatable movement of said cam and moved in a latch releasing direction upon one direction of rotation of said cam and moved in a latching direction upon an opposite direction of rotation of said cam to accommodate the placing of copy on said copyboard and to positively lock said copyboard in a closed position upon the placing of copy thereon and prior to turning movement of said copyboard about said trunnion supports.

7. A copyboard having a base section and a cover section hingedly mounted on said base section for opening and closing movement, spaced trunnion shafts extending laterally from said base section intermediate the ends thereof and trunnion supports for said shafts mounting said copyboard for movement into horizontal and vertical positions, a latch for releasably locking said cover section closed, power means for releasing said latch and then pivoting said cover section into an open position when said copyboard is in a horizontal position and closing said cover section and engaging said latch upon loading of said copyboard, including a cam shaft extending parallel to and spaced from an associated trunnion shaft, a locking cam on said shaft, a release member on said base section connected with said latch and engaged by said locking cam upon rotatable movement of said cam to release said latch in one direction of rotation of said cam and to latch said latch in an opposite direction of rotation of said cam, and means operating in timed relation with respect to said locking cam for opening and closing said copyboard comprising a vertically guided slide on the same side of said copyboard as said cam and having spaced abutments, a lever pivotally mounted on and extending from said base section toward said slide and moving into the space between said abutments upon movement of said copyboard into a horizontal loading or unloading position, link and lever means operated by said lever and alternately moving said slide vertically in opposite directions to effect opening and closing of said cover.

8. In a copyboard, a base section and a cover section hinged to said base section for selective opening and closing movement, pivotal support means for said copyboard including trunnion shafts extending laterally from said base section intermediate the ends thereof and upright trunnion supports for said trunnion shafts, means moving said copyboard from a vertical copying position to horizontal loading and unloading positions and holding said copyboard in these positions, power operated means for opening and closing said cover section comprising a rock shaft mounted on said base section adjacent the side of said base section to which said cover section is hinged, a yieldably extensible lever extending radially of said rock shaft and having pivotal connection with said cover section intermediate the ends thereof, a lever arm extending from and secured to said rock shaft and extending outwardly of said base section in an opposite direction from said yieldably extensible lever, a follower on the outer end of said lever arm, a vertically guided slide having spaced abutments facing said follower, power means for alternately moving said slide vertically in opposite directions, said follower moving into the space between said abutments upon movement of said copyboard into a horizontal position, and said means for moving said copyboard into vertical and horizontal positions and holding said copyboard in these positions also positioning said follower in the space between said abutments when said copyboard is in a horizontal position.

9. In a copyboard, a base section and a cover section hinged to said base section for selective opening and closing movement, pivotal support means for said copyboard including trunnion shafts extending laterally from said base section intermediate the ends thereof and upright trunnion supports for said trunnion shafts, means moving said copyboard from a vertical copying position to horizontal loading and unloading positions and holding said copyboard in these positions, power operated means for opening and closing said cover section comprising a rock shaft mounted on said base section adjacent the side of said base section to which said cover section is hinged, a yieldably extensible lever extending radially of said rock shaft and having pivotal connection with said cover section intermediate the ends thereof, a lever arm extending from and secured to said rock shaft and extending outwardly of said base section in an opposite direction from said yieldably extensible lever, a follower on the outer end of said lever arm, a vertically guided slide having spaced abutments facing said follower, a reversibly movable cam shaft, a cam on said cam shaft, means driving said cam shaft and cam in reverse cycles of oscillatable movement, a lever having a follower thereon engageable with said cam and a second lever connected with said last mentioned lever and having operative connection with said slide for vertically moving said slide in cover opening and closing directions in accordance with the direction of rotation of said cam shaft, said cam shaft also driving said means for moving said copyboard from a vertical copying position to a horizontal loading and unloading position to effect the positioning of said follower in registry with the space between said abutments as said copyboard is moved into horizontally extending loading and unloading positions.

10. In a copyboard, a base section, a cover section pivotally mounted on said base section for selective opening and closing movement, latch means releasably locking said cover section in a closed position, trunnion shafts extending laterally from said base section intermediate the ends thereof, upright trunnion supports for said trunnion shafts, power means for first turning said copyboard from a vertical copying position to a horizontal loading and unloading position, then releasing said latch means and opening said cover including a lever arm on one of said trunnion shafts and having an outwardly opening radial slot therein with concave indexing surfaces on opposite side of said slot, a driven member having a circumferential rim extending for a portion of the periphery thereof and having a driver member intermediate the ends of said rim and spaced radially outwardly therefrom, said indexing surface conforming to and engaging said rim and positioning said slot to be engaged by said driver member upon rotation of said driver member and also positioning said copyboard to enable first release of said latch means and then opening of said cover.

11. In a copyboard, a base section, a cover section pivotally mounted on said base section for selective opening and closing movement, latch means releasably locking said cover section in a closed position, trunnion shafts extending laterally from said base section intermediate the ends thereof, upright trunnion supports for said trunnion shafts, power means for first turning said copyboard from a vertical copying position to horizontal loading and unloading positions, then releasing said latch means and opening said cover comprising a cam shaft, a driving member on said shaft, a lever arm on an associated trunnion shaft and having an outwardly opening radial slot therein and concave indexing surfaces on opposite sides of said slot, said driving member having a circumferential indexing rim extending for a portion of the periphery thereof and having a driver member intermediate the ends of said rim spaced radially outwardly therefrom, said indexing surface conforming to and engaging said rim and positioning said slot to be engaged by said driver member upon rotation of said cam shaft and also positioning said copyboard for release of said latch means and opening of said cover, and individual cams on said cam shaft for first releasing said latch means as said copyboard moves from a vertical to a horizontal position and then opening said copyboard all under the control of said power means for turning said copyboard.

12. A copyboard having a base section and a cover section hinged to said base section for selective opening and closing movement, means releasably holding said cover section in a closed position, support means for said base section supporting said base section for pivotal movement into a vertical copy position and into horizontal copy loading and unloading positions, and power means for moving said copyboard into vertical and horizontal positions and indexing said copyboard in these positions comprising an oscillatably driven driving member having a driver member thereon, a driven member having operative connection with said copyboard and slidably engaged by said driver member and oscillatably driven thereby and having oppositely facing stop faces thereon limiting movement of said driven member as the copyboard is positioned into its vertical and horizontal positions and stopping the copyboard in these positions.

References Cited by the Examiner
UNITED STATES PATENTS
2,799,204   7/57   Blatherwick _____ 88—24

NORTON ANSHER, Primary Examiner.
WILLIAM MISIEK, Examiner.